（12） United States Patent
Souhrada et al.

(10) Patent No.: US 11,429,423 B2
(45) Date of Patent: Aug. 30, 2022

(54) WORKLOAD SCHEDULING WITH LOCALIZED VIRTUAL NETWORK RESOURCES

(71) Applicant: Kyndryl, Inc., New York, NY (US)

(72) Inventors: William C. Souhrada, Southampton, NY (US); Fernando Matos, Hellertown, PA (US); Baiju Dhirajlal Mandalia, Boca Raton, FL (US)

(73) Assignee: KYNDRYL, INC., New York, NY (US)

( * ) Notice: Subject to any disclaimer, the term of this patent is extended or adjusted under 35 U.S.C. 154(b) by 261 days.

(21) Appl. No.: 16/736,230

(22) Filed: Jan. 7, 2020

(65) Prior Publication Data

US 2021/0208919 A1    Jul. 8, 2021

(51) Int. Cl.
| | |
|---|---|
| *G06F 9/455* | (2018.01) |
| *G06F 9/50* | (2006.01) |
| *G06F 9/48* | (2006.01) |
| *H04L 12/46* | (2006.01) |
| *H04L 67/10* | (2022.01) |
| *H04L 47/76* | (2022.01) |

(52) U.S. Cl.
CPC ........ *G06F 9/45558* (2013.01); *G06F 9/4881* (2013.01); *G06F 9/5077* (2013.01); *H04L 12/4641* (2013.01); *H04L 47/76* (2013.01); *H04L 67/10* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,683,484 B2 | 3/2014 | Srinivasan | |
| 8,843,386 B2 | 9/2014 | Greene et al. | |
| 9,432,350 B2 | 8/2016 | Anderson et al. | |
| 9,703,584 B2 | 7/2017 | Kottomtharayil et al. | |
| 10,104,642 B2 * | 10/2018 | Brennan | H04W 4/80 |
| 10,514,951 B2 * | 12/2019 | Bahramshahry | G06F 9/5027 |
| 10,542,104 B2 * | 1/2020 | Williams | H04L 41/12 |
| 10,554,740 B2 * | 2/2020 | Bailey | H04L 67/1025 |
| 10,620,988 B2 * | 4/2020 | Lauderdale | G06F 8/458 |
| 2017/0188383 A1 | 6/2017 | Pelletier et al. | |
| 2018/0255150 A1 * | 9/2018 | Williams | H04L 41/12 |

(Continued)

OTHER PUBLICATIONS

Cohen et al., An Intent-Based Approach for Network Virtualization, 2017.

(Continued)

*Primary Examiner* — Van H Nguyen
(74) *Attorney, Agent, or Firm* — Erik Swanson; Andrew M. Calderon; Roberts Calderon Safran & Cole, P.C.

(57) ABSTRACT

A computer-implemented method and system for workload scheduling based on localizing virtual computing resources. The computer implemented method includes, in one embodiment, localizing a first computing resource having a workload under execution, the first computing resource being associated with a set of virtual computing resources. An embodiment includes rescheduling, responsive to the localizing, the workload for execution at least partially at a second computing resource in the set of virtual computing resources.

17 Claims, 13 Drawing Sheets

(56) References Cited

U.S. PATENT DOCUMENTS

2020/0210939 A1* 7/2020 Kolodner ....... G06Q 10/063114
2020/0341789 A1* 10/2020 Ghag .................. H04L 41/5058

OTHER PUBLICATIONS

Hosken et al., Architecting a Hybrid Mobility Strategy with the VMware Cloud Provider Program, Version 2.9, 2018.

IP.com, System and Method for Network Load Balancing in a Cloud Environment, IP.com No. IPCOM000240937D, Mar. 12, 2015.

IP.com, A Pay-Per-Use Based Mechanism for Billing Workload Execution in a Cloud Infrastructure, IP.com No. IPCOM000235504D, Mar. 5, 2014.

IBM, Method and System for Workload Routing in a Cloud, IP.com No. IPCOM000190107D, Nov. 17, 2009.

* cited by examiner

WORKLOAD SCHEDULING WITH LOCALIZED VIRTUAL NETWORK RESOURCES

TECHNICAL FIELD

The present invention relates generally to data processing systems, and more particularly, to scheduling of workloads in virtualized networks.

BACKGROUND

Cloud computing has changed the way applications can be deployed on demand using virtual servers. Virtual servers are scalable and come with dedicated core and memory allocations. They allow compute resources that can be added in minutes. The hypervisors which can run multiple virtual machines are fully managed by the cloud providers and can perform configuration and management tasks by using cloud provisioning tools. Virtualized network computing serves client workloads deployed into discrete compute clusters resident to a specific and identifiable physical data center. However, virtualized networks and storage compute clusters may also be leveraged across multiple datacenters in different physical locations, a model especially pertinent to cloud based virtualized networking. An example of such compute cluster is a point of delivery (POD), a module of network, compute, storage, and application components that work together to deliver virtualized compute services. Such POD components constitute a deployable module which delivers a service and maximizes the modularity, scalability, and manageability of data centers. The modular design principle has been applied to data networks through a repeatable node design describing the configuration of computing and communication equipment housed in point of presence facilities. The POD design pattern is especially applicable in data networking service provider infrastructure, for instance in datacenters supporting cloud based virtual computing services, in order to sustain scalability as usage grows.

SUMMARY

The illustrative embodiments provide a method, system, and computer program product. An embodiment includes localizing a first computing resource having a workload under execution, the first computing resource being associated with a set of virtual computing resources. An embodiment includes localizing the first computing resource based on determining a coordinate position of the first computing resource using a wireless beacon signal broadcast deployed in a datacenter An embodiment includes rescheduling, responsive to the localizing, the workload for execution at least partially at a second computing resource in the set of virtual computing resources.

An embodiment includes a computer usable program product. The computer usable program product includes one or more computer-readable storage devices. Program instructions stored on at least one of the one or more storage devices are executable in one or more processors to provide for workload scheduling based on localizing virtual computing resources.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide for workload scheduling based on localizing virtual computing resources.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
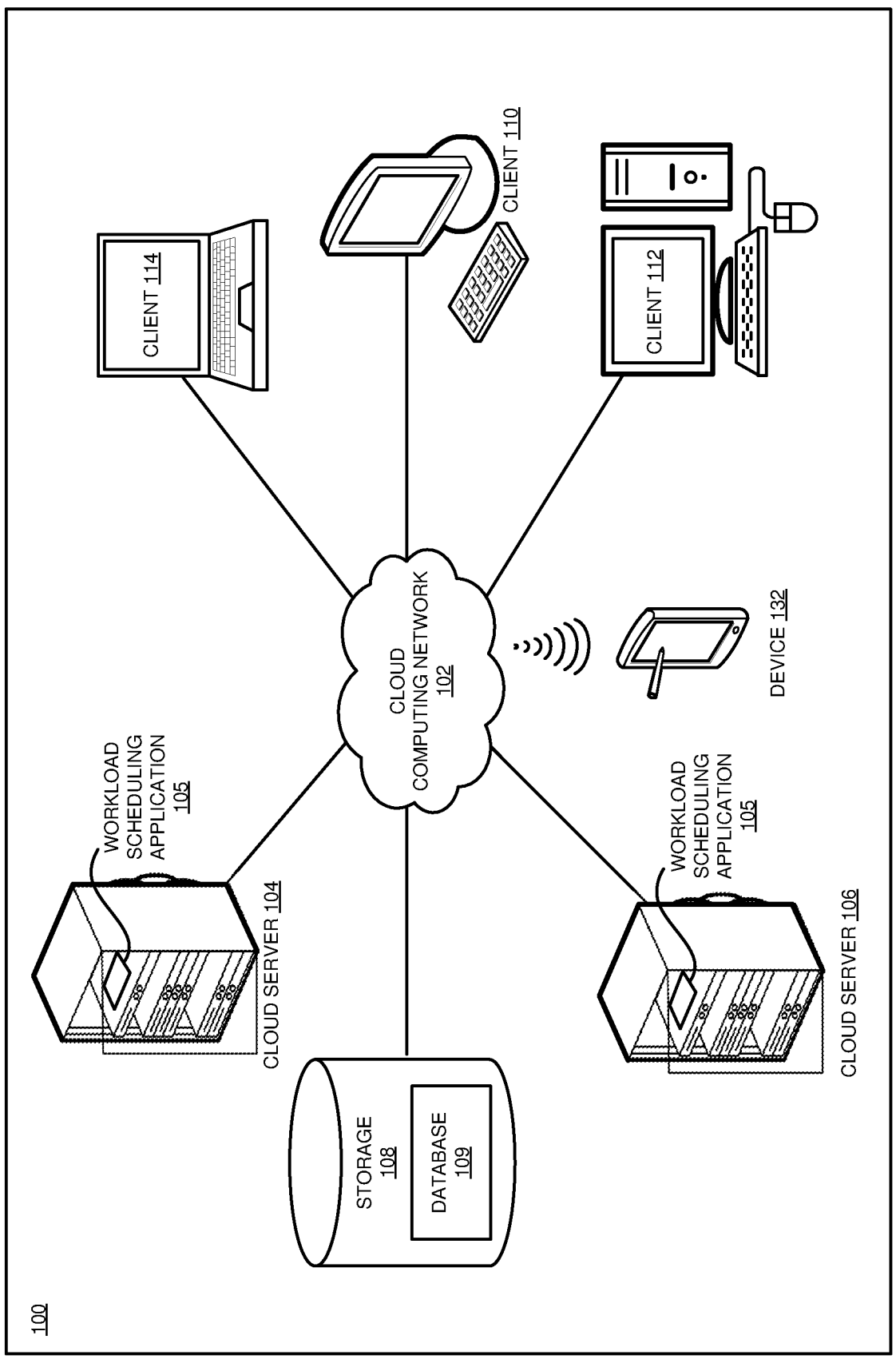
FIG. 1 depicts a block diagram of a data processing systems in which illustrative embodiments of workload scheduling based on localizing virtual computing resources are implemented.

The illustrative embodiments recognize that there is a need for providing a user or a given user group with solutions described herein that increase virtual computing resource efficiencies by scheduling or re-scheduling client workloads based on localizing virtual computing resources deployed in a virtual computing system. The terms "localize" and "localizing" as used herein refer to determining a coordinate location of a physical computing resource that is allocated and deployed for service client workloads within a virtual computing system. The coordinate location can be based on either a global or a local coordinate system.

Embodiments herein recognize that physical locations and proximities of the underlying computing resources, including memory storage and processor resources, used in virtual computing to service client workloads are often difficult to keep track of and update in a timely manner. Such physical factors may have associated adverse implications, among other considerations, that can adversely influence system performance and efficiency. In compute, storage, and network virtualization, the traditional mechanisms for determining compute resources physical location of compute resources may no longer be reliable. This is applicable to both cloud and traditional enterprise computing based on virtualization. An internet protocol (IP) subnet where the virtualized compute resource is addressed, or the storage device that the virtualized compute resource is placed upon can be stretched across both physical and geographical boundaries. It is also possible for the virtualized compute resource to be moved seamlessly across any physical boundary.

Among other technical advantages and benefits, embodiments herein provide workload scheduling and re-scheduling decisions that include moving or re-assigning a workload under execution to a different physical computing resource. The different physical computing resources can constitute virtual machines, memory storage and computer processor resources of a virtualized network. The workload execution can be moved or re-assigned to different physical locations in order to provide increased responsiveness and processing efficiency with regard to the workload execution within a given virtual computing network. Among other benefits and advantages, embodiment herein address potential system latency issues, with the intent of increasing performance and responsiveness, between the end user and the virtualized compute resource by way of determining data residency for a virtualized compute resource. Embodiments also provide for determining where to locate virtualized compute resources for resiliency purposes or disaster recovery purposes. Embodiments also enable security systems to properly locate and isolate virtualized compute resources to pre-empt and prevent the propagation of security incidents. Related embodiments allow billing systems to incorporate billing and charging for services related to virtualized compute resources. Other advantages provide by embodiments described herein include enabling operations teams to locate and isolate virtualized compute resources in order to reduce the length of outages or maintenance windows. In particular, embodiments provide for using physical location to decide or determining where to run or schedule a virtualized compute resource, such as a virtual machine (VM) or container, when deployed on virtualized compute, network and storage resources.

With further regard to existing solutions, embodiments herein recognize that when virtualized server or application workloads are deployed onto overlay networks that extend across multiple physical datacenter or geographical locations, traditional means of identifying a workloads physical location, such as using its IP address, become unreliable. In particular, mechanisms traditionally used to indicate system locality include IP Address and Subnet information. However, increased usage of VPN tunneling, overlay networks, and virtual bridging allow for easily extending layer 2 network segments across physical locations and underlying infrastructure, and have an adverse consequence where an IP address associated with a virtualized workload execution can no longer be a reliable mechanism for indicating its physical location.

Other existing approaches also have applicable limitations. For example, use of network IP address can be inherently inaccurate due to stretching of layer 2 network segments using overlays, bridges, tunnels, and by affect IP subnets. Other naming conventions can be rendered useless when servers are swapped and hostnames changed during maintenance, so using traditional asset naming cannot always be accurate. Compute clusters may not span physical locations, causing lack of flexibility and conflict with many cloud models. Labels and tags may be applied and with workload deployments. However, such labels or tags are dependent upon accurate initial configuration and assignment, and themselves do not draw upon an actual physical location. Spreadsheets may be created and deployed, but information is entered upon initial deployment and rarely get updated. This causes inaccuracies in locating physical computing resources in a dynamic cloud based virtual computing environment.

Illustrative embodiments herein eliminate or minimize the latter problems and provide a mechanism for discovering, via localizing, the physical location of a virtualized workload during scheduling decisions, such as on which host to run a virtual machine (VM) on, on which virtual network node to run a container on. Embodiments herein provide various mechanisms for a virtualized compute resource to be tagged or associated with a physical location, via smart beacon, via BIOS ID, via network beacon, in some examples, so that where the virtualized compute resource is physically placed for its main execution can be optimized. In particular, a localization mechanism provides the system scheduling the virtualized workload with an accurate physical coordinate location that can be used in workload scheduling decisions. Some embodiments optimize these workload scheduling decisions and adjust virtualized workload placement to achieve better performance, lower latency, and even address data locality requirements. Furthermore, the mechanism described can be correlated with other compute, storage, localized network, and system maintenance and availability in determining initial workload placement as well as adjustments to initial placement.

An embodiment can be implemented as a workload scheduling application constituted of any combination of hardware and software program instructions. The workload scheduling application implementing an embodiment can be configured as a modification of an existing server computing device or system, as a separate application that operates in conjunction with a server device, or some combination thereof.

A method of an embodiment described herein, when implemented to execute on a device or data processing system, comprises substantial advancement of the functionality of that device or data processing system to schedule or re-schedule client workloads based on localizing virtual computing resources within one or more virtual computing networks. Among other benefits and advantages, embodiments herein address potential system latency issues, in the intent of increasing performance and responsiveness, between the end user and the virtualized compute resource by way of determining data residency for a virtualized compute resource. Embodiments provide for determining where to locate virtualized compute resources for resiliency or disaster recovery purposes. Embodiment also enable security systems properly locate and isolate virtualized compute resources to pre-empt and prevent the propagation of security incidents. Related embodiments allow billing systems to incorporate billing and charging for services related to virtualized compute resources. Other advantages provided by embodiments described herein include enabling operations teams to locate and isolate virtualized compute resources in order to reduce the length of outages or maintenance windows.

The illustrative embodiments are described with respect to workload scheduling applications that are constituted of any combination of hardware and software program instructions, including workload scheduling applications installed on server devices and systems, physical CPU cores, virtual CPU, server devices, memory storage devices, hypervisor applications, data processing systems, virtual machines and container environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a workload scheduling application at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
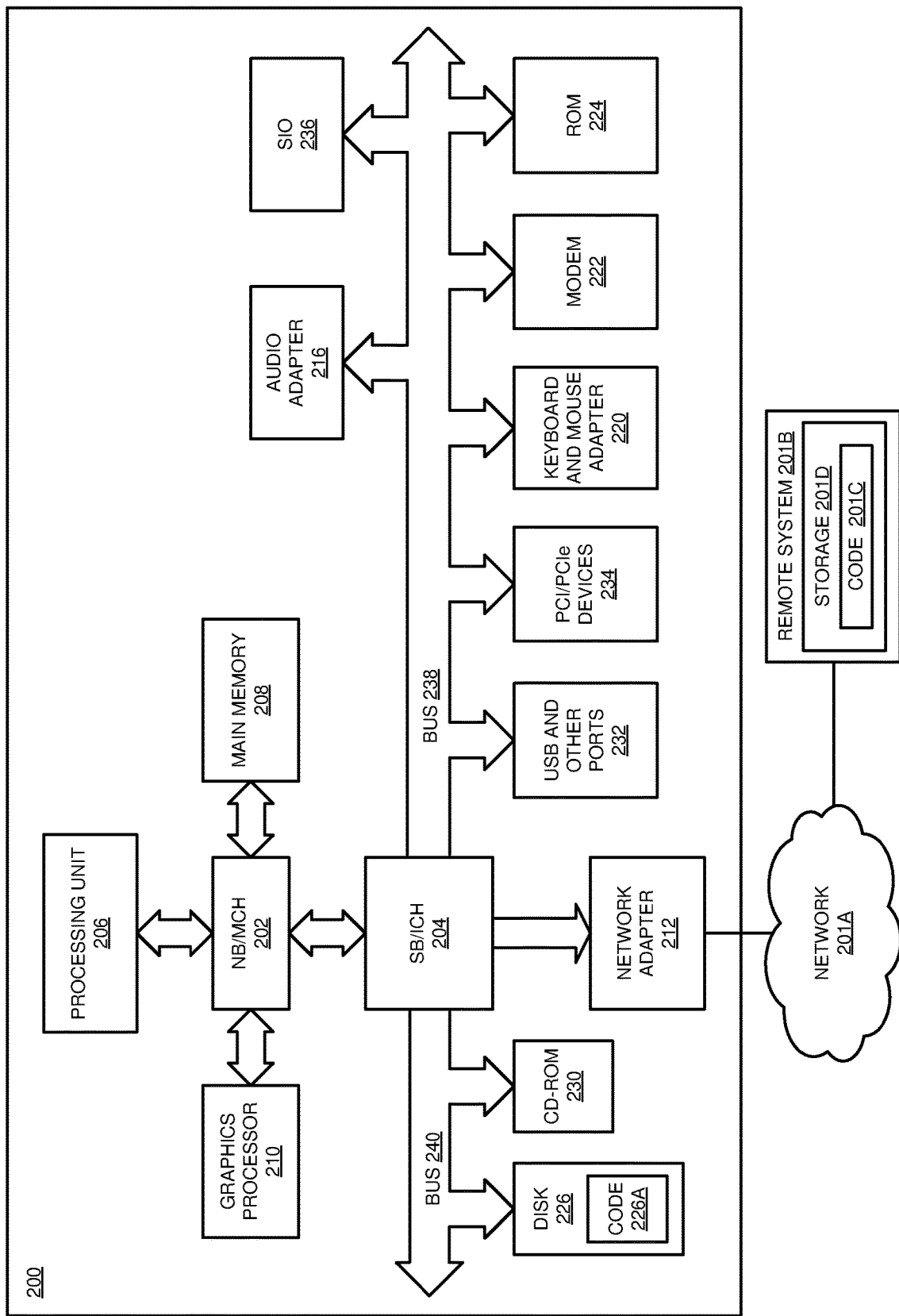
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a data processing systems in which illustrative embodiments of workload scheduling based on localizing virtual computing resources are implemented. Data processing environment 100 is a network of computers including virtualized computing resources in which the illustrative embodiments are implemented. Data processing environment 100 includes cloud computing network 102. Cloud computing network 102 is the medium used to provide communications links between various devices and computers connected together within data processing environment 100 which includes virtualized computing resources. Cloud computing network 102 may include connections, such as wire, wireless communication links, or fiber optic cables.

Clients or servers are only example roles of certain data processing systems connected to cloud computing network 102 and are not intended to exclude other configurations or roles for these data processing systems. Cloud computing server 104 and cloud computing server 106 couple to cloud computing network 102 along with storage unit 108. Software applications may execute on any computer in data processing environment 100. Clients 112, 114 are also coupled to cloud computing network 102. A data processing system, such as cloud computing server 104 or 106, or clients 112, 114 may contain data and may have software applications or software tools executing thereon.

Only as an example, and without implying any limitation to such architecture, FIG. 1 depicts certain components that are usable in an example implementation of an embodiment. For example, cloud computing cloud computing servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Workload scheduling application 105 implements an embodiment described herein. Workload scheduling application 105 can be comprised of any combination of hardware and software program instructions executable in one or more processors. Workload scheduling application 105 can execute in cloud computing servers 104 and 106, storage unit 108, and clients 112, 114 coupled to cloud computing network 102 using wired connections, wireless communication protocols, or other suitable data connectivity. Clients 112, 114 may be, for example, a portable personal computer.

In the depicted example, cloud computing server 104 provides data, such as boot files, operating system images, and applications to clients 112, 114. Clients 112, 114 and devices 132, 134 may be clients to cloud computing server 104 in this example. Clients 112, 114 as well as devices 132, 134 may include their own data, boot files, operating system images, and applications. Data processing environment 100 may include additional servers, clients, and other devices that are not shown.

In the depicted example, data processing environment 100 may be the Internet. Cloud computing network 102 may represent a collection of networks, virtualized computing resources and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network that includes virtualized computing resources such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as cloud computing servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as workload scheduling application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
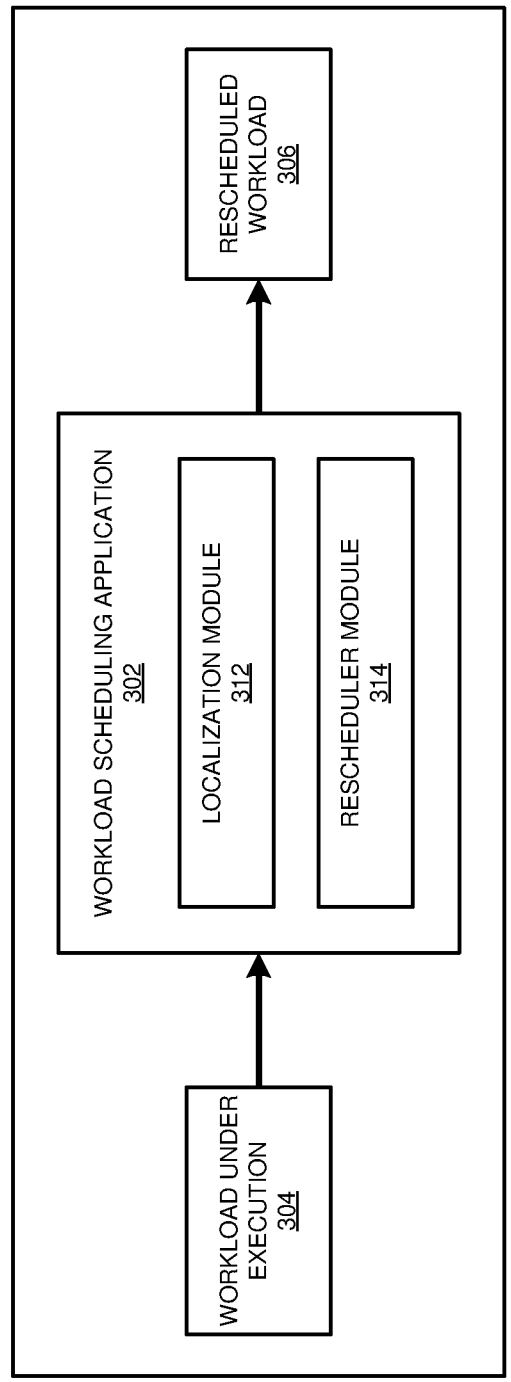
FIG. 3 depicts a block diagram of an example implementing workload scheduling based on localizing virtual computing resources.

FIG. 3 depicts a block diagram of functional aspects of a data processing system in which illustrative embodiments of workload scheduling based on localizing virtual computing resources are implemented. In an embodiment in accordance with FIG. 3, Workload scheduling application 302, corresponding to workload scheduling application 105 of the embodiment of FIG. 1, is installed on cloud computing servers 104, 106. Workload scheduling application 105 includes any combination of executable program instructions and hardware to implement localization module 312 and re-scheduler module 314 for workload rescheduling based on localizing virtual computing resources. In some embodiments, workload scheduling application 302 comprises program instructions stored on one or more storage devices of cloud computing server 104, 106 for execution by one or more processors. Workload scheduling application 302 operates based at least in part on workload under execution module 304 input and generates rescheduled workload 306 as output in some embodiments.

Embodiments herein eliminate the problems of the existing solutions based at least in part upon accurately localizing computing resources associated with a workload under execution. In accordance with embodiments described herein, among other technical advantages and benefits, the mechanisms described herein can be correlated with other compute, storage, localized network, virtual machines, device localization techniques, hypervisor applications, container platform (including but not limited to a kubernetes scheduler, for example) and system maintenance/availability in determining initial workload placement as well as adjustments to an initial workload placement.

Figure 4:
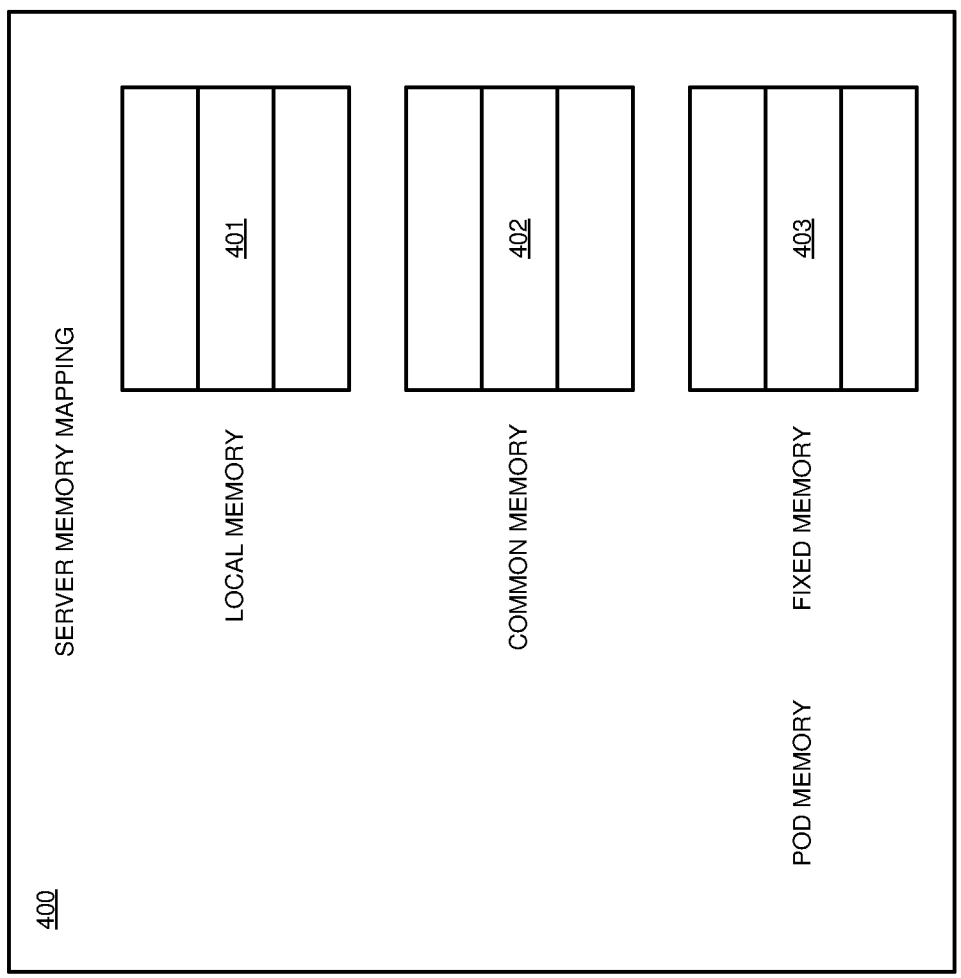
FIG. 4 depicts an illustrative embodiment of a server memory mapping configuration for localizing virtual computing resources implementing workload scheduling.

FIG. 4 depicts an illustrative embodiment of a server memory mapping configuration 400 for localizing virtual computing resources deployed in executing client workloads. The mapped server memory, based on an illustrative serial numbering scheme as will be described in the embodiments related to FIG. 5 below, is communicatively accessible by the server devices and hypervisor applications executing thereon, within the virtual computing network. The server memory mapping configuration 400 in an embodiment, is based on of non-transitory memory devices including local memory 401, common memory 402 and fixed memory 403 in POD devices associated with respective POD chassis.

Figure 5:
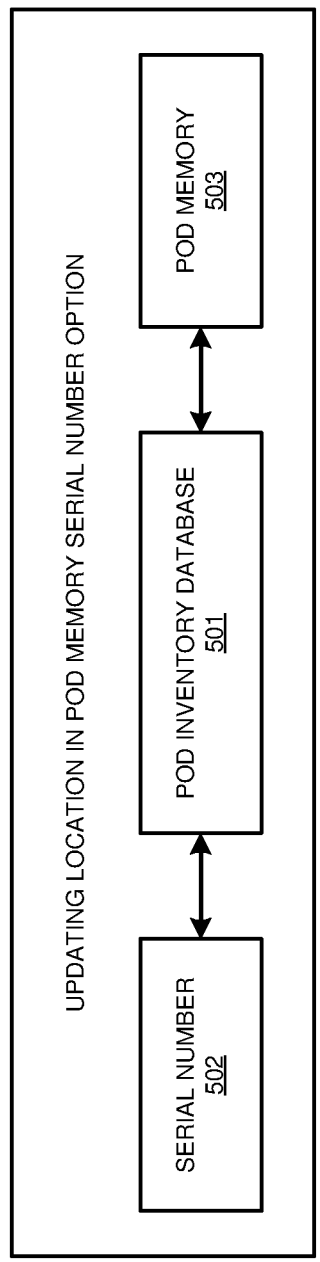
FIG. 5 depicts an illustrative embodiment of an option for storing and updating POD location information in a POD memory.

FIG. 5 depicts an illustrative embodiment of an option for storing and updating location information of a POD chassis in a POD memory. In some embodiments, localizing virtual computing resources, including server devices housed in a POD chassis, can employ a POD inventory database 501. Such configuration constitutes an embodiment to store and accessibly retrieve serial number 502 storable in POD memory 503 in order to obtain POD location information. In some embodiments, the location related information stored in POD memory 503 can include, though not necessarily be limited to, a geographical region or data locality, and also identify a datacenter, and a particular site or building, associated with a given POD identifier.

Figure 6:
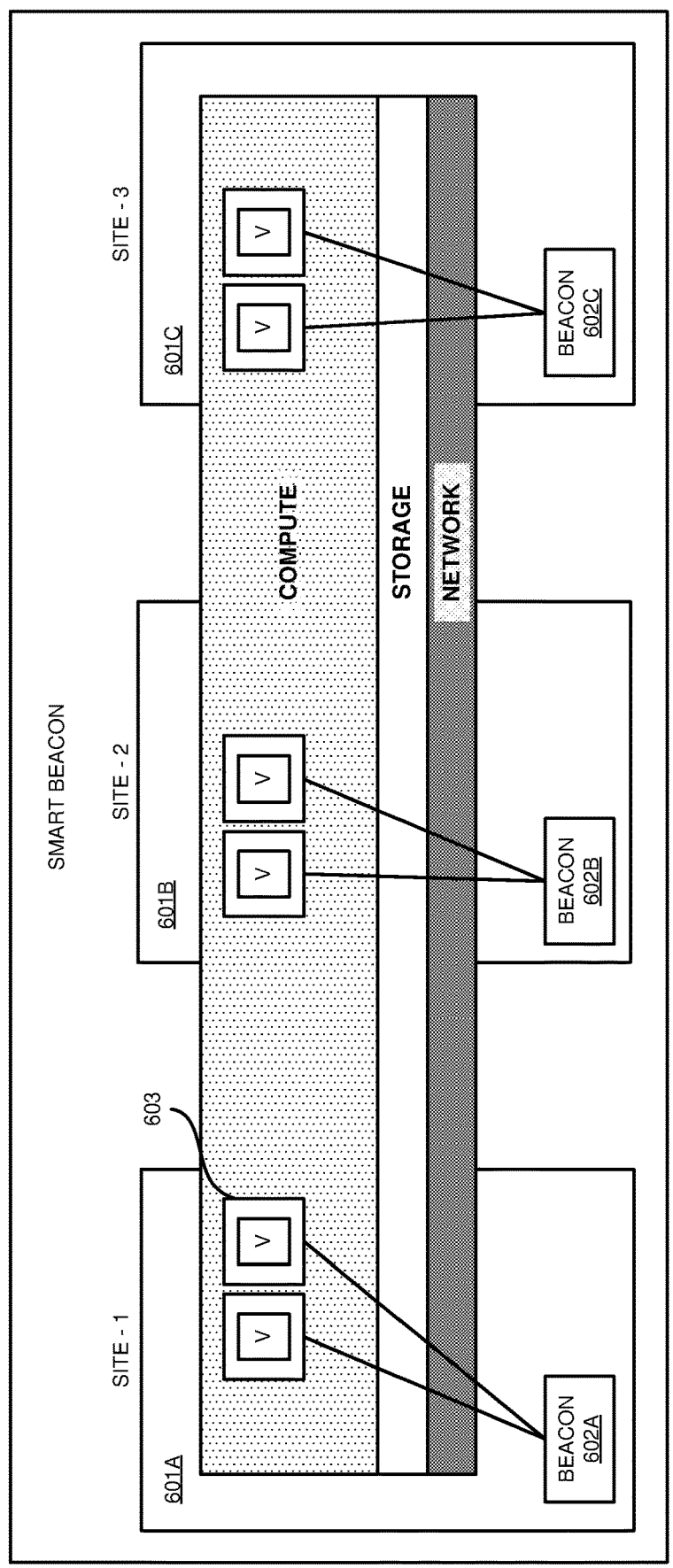
FIG. 6 depicts an illustrative embodiment of a smart beacon configuration for localizing virtual computing resources deployed in workload execution and workload scheduling.

FIG. 6 depicts an illustrative embodiment of a smart beacon based configuration for localizing virtual computing resources deployed in workload execution and workload scheduling. Illustrative sites 601A, 601B and 601C may be geographically dispersed or co-located, or any combination thereof. Sites 610A, 601B and 601C house various distributed physical computing resources 603, including memory storage and processing resources, that comprise and provide virtual computing resources and services used in executing client workloads. Smart beacons 602A, 602B and 602C may be located within a site or building that houses a given POD chassis, and broadcast wireless beacon signals encoding physical location information, including coordinate information, detectable by server devices of the POS chassis. In this manner, a smart beacon inside of the datacenter can broadcast location data, which in turn can be detected, read and stored or learned by physical servers. Each physical server would have a radio frequency (RF) receiver incorporated therewith and store the location information in memory to be read by the hypervisor or virtualized workload. Smart beacons 602A, 602B and 602C in this illustrative embodiment, thus broadcast physical location data and enable a mechanism that indicates physical location of the virtualized computing resources including virtual machines and containers housed in the given physical buildings or sites.

Figure 7:
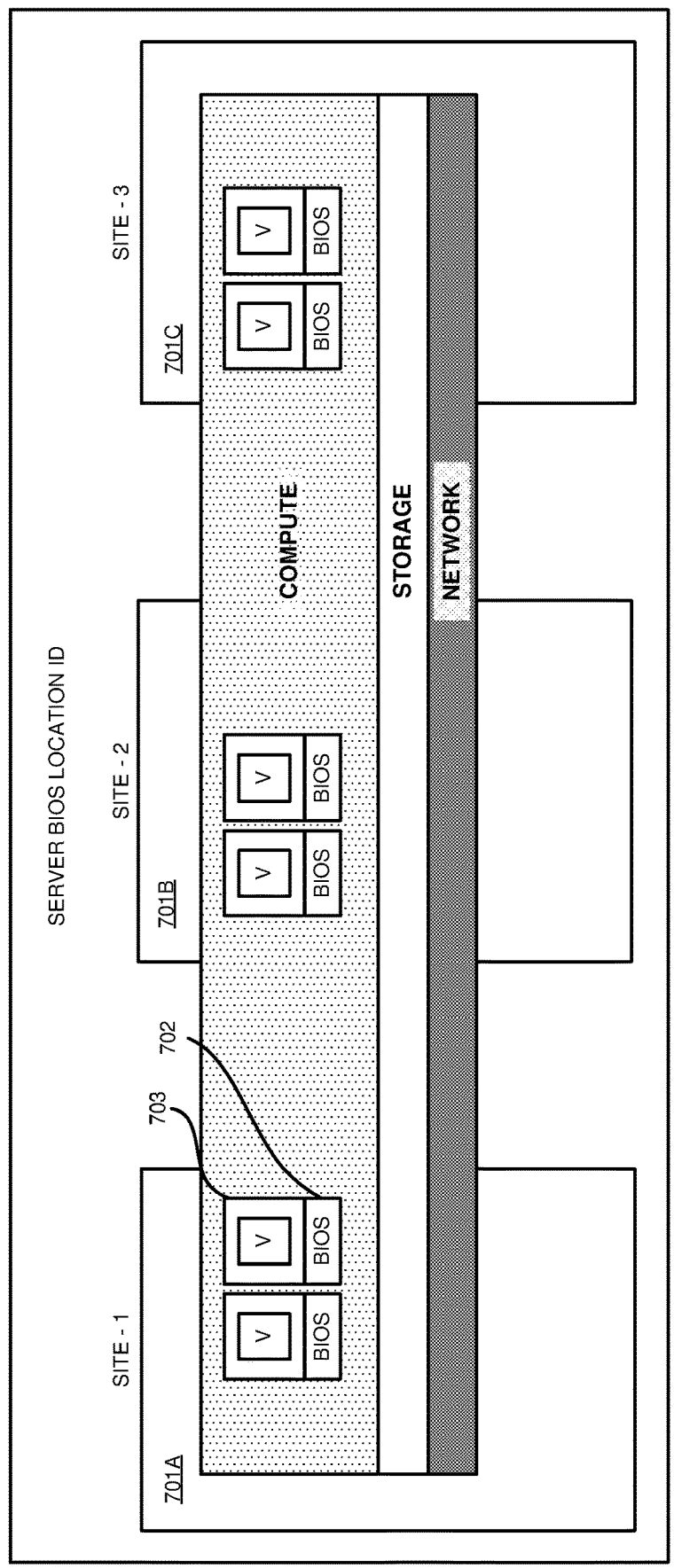
FIG. 7 depicts an illustrative embodiment of a server BIOS Location ID configuration for localizing virtual computing resources deployed in workload execution and workload scheduling.

FIG. 7 depicts an illustrative embodiment of a server BIOS Location Identifier (ID) based configuration for localizing virtual computing resources deployed in workload execution and workload scheduling. Illustrative sites 701A, 701B and 701C may be geographically dispersed or co-located, or any combination thereof. Sites 701A, 701B and 701C house various distributed physical computing resources 703, including memory storage and processing resources, that comprise and provide virtual computing resources and services used in executing client workloads. A physical server hardware having an associated BIOS location field 703 can be read by a hypervisor application under execution or by a virtualized workload under execution.

Figure 8:
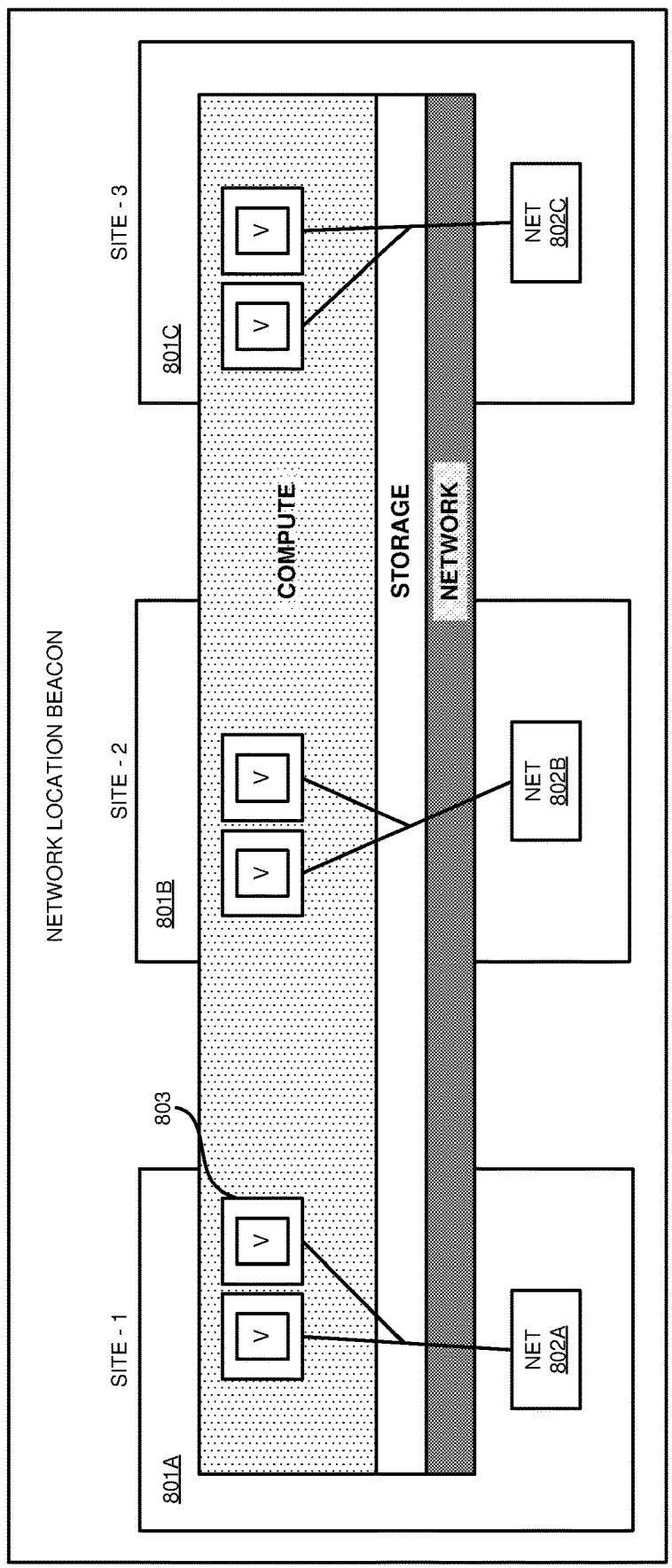
FIG. 8 depicts an illustrative embodiment of a location beacon configuration for localizing virtual computing resources deployed in workload execution and workload scheduling.

FIG. 8 depicts an illustrative embodiment of a network location beacon 802A, 802B, 802C configuration for localizing virtual computing resources 803 deployed in workload execution and workload scheduling within sites 802A, 802B, 802C. This embodiment constitutes a variation of the embodiment of FIG. 6 and operates similarly using wireless beacon signals associated with a network physical location.

Figure 9:
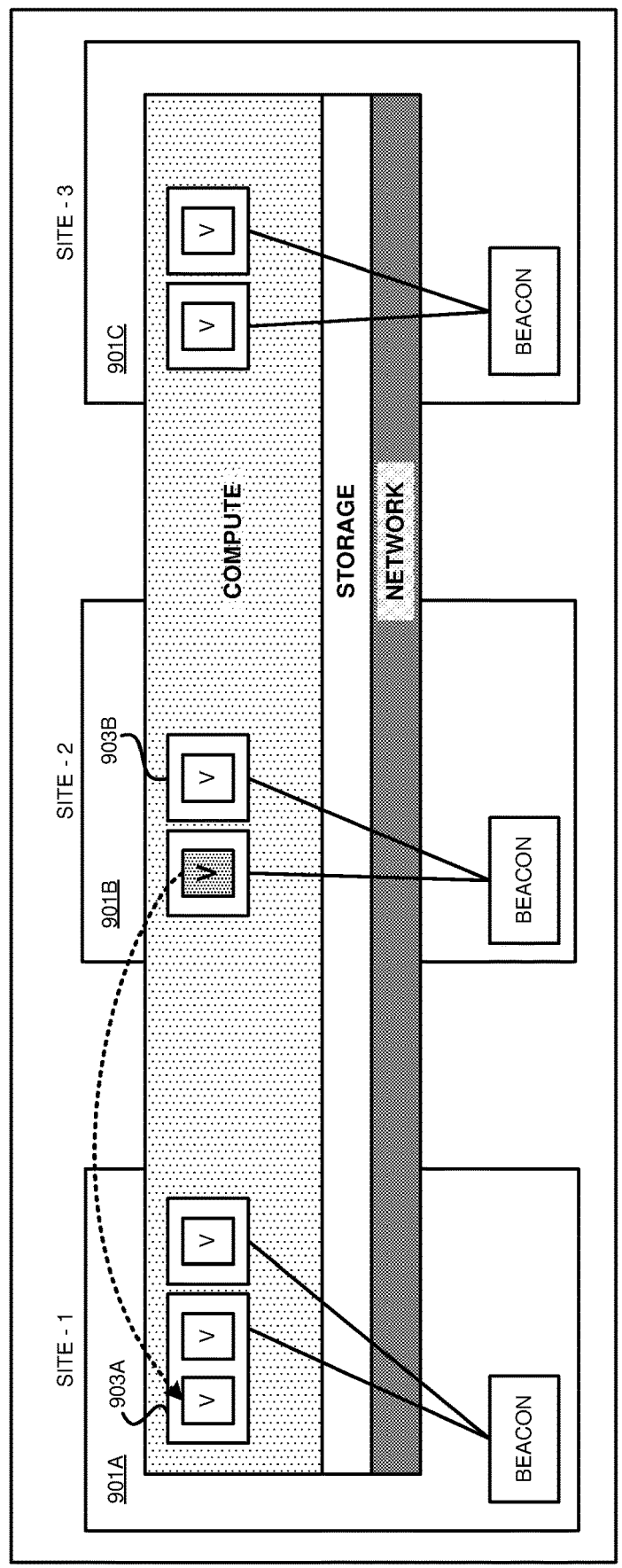
FIG. 9 depicts an illustrative embodiment of a network location beacon configuration for workload rescheduling of virtual computing resources deployed in workload execution.

FIG. 9 depicts an illustrative embodiment of a network location beacon configuration for workload rescheduling of virtual computing resources deployed in workload execution. Among different sites 901A, 901B and 901C, rescheduling the workload under execution consists of redeploying, or at least partially redeploying the execution of the client workload from physical computing resource 903B to 903A. In one embodiment, the redeploying may be triggered or initiated based on automatic or manual actions. The automatic actions or triggers may include, but not necessarily limited to, determining respective latency performance parameters for a first and at least a second computing resource respectively relative to the workload under execution. In other embodiments, In one embodiment, the automatic actions or triggers may include, but not necessarily limited to, identifying a requirement for conformance with data locality requirements. Then switching, responsive to a trigger based on such automatic or manual actions, execution of the workload from the first computing resource 903B to the second computing resource 903A.

In some embodiments, the latency performance parameter may be a latency duration measurement associated with transmission of one or more data packets between a hypervisor application executing on a server device and one or more physical computing resources of the virtualized network, and measuring the latency durations associated with the data packet transmitted to and from. In other embodiments, the latency measurement can include processing times at a targeted computing resource in addition to communication transmission durations. In yet another variation, the latency performance parameter may be a latency measurement associated with transmission of one or more data packets between the workload under execution and one or more physical computing resources of the virtualized compute resources, and measuring latency durations associated with the data packet transmitted to and from.

Figure 10:
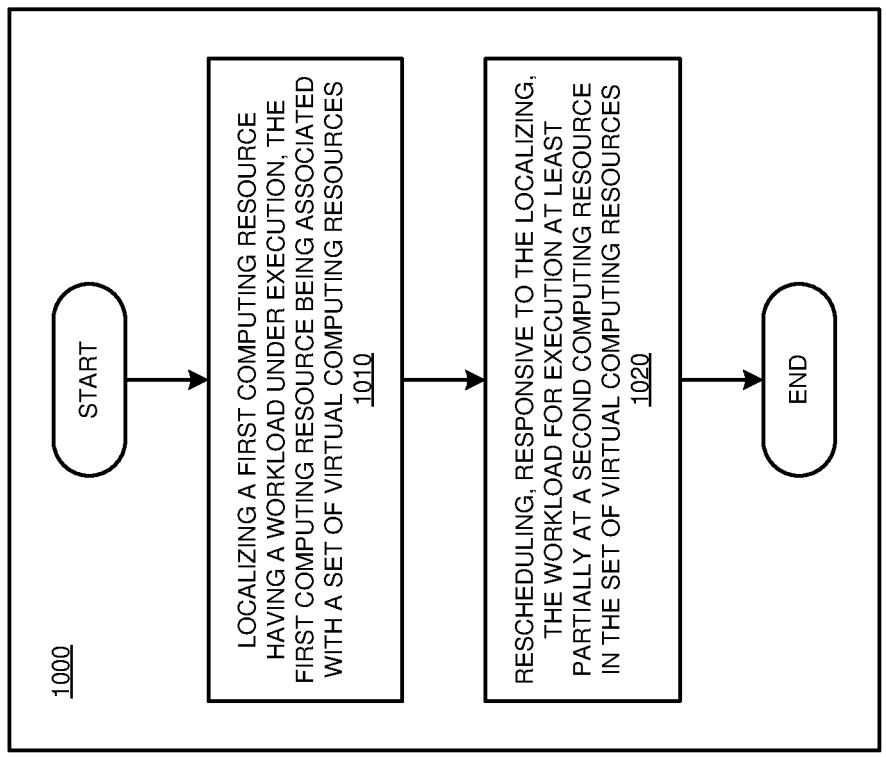
FIG. 10 depicts a flowchart of an example process for workload scheduling based on localizing virtual computing resources.

FIG. 10 depicts a flowchart of an example process for workload scheduling based on localizing virtual computing resources.

At block 1010, localizing a first computing resource having a workload under execution, the first computing resource being associated with a set of virtual computing resources.

At block 1020, rescheduling, responsive to the localizing, the workload for execution at least partially at a second computing resource in the set of virtual computing resources.

Figure 11:
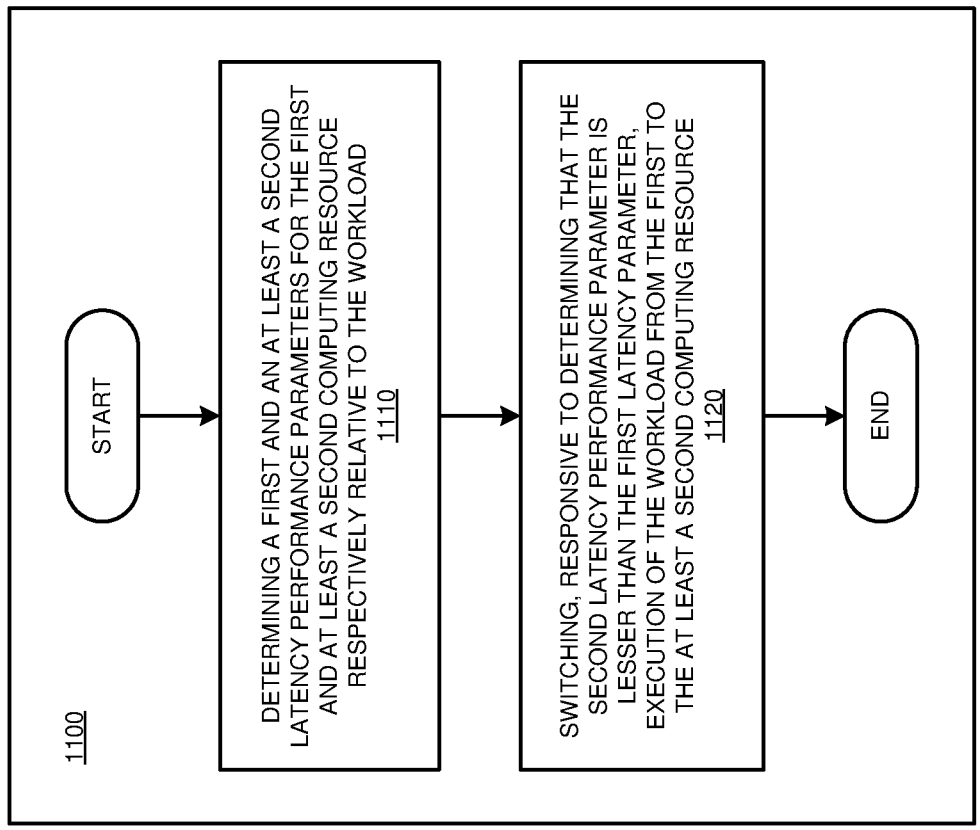
FIG. 11 depicts a flowchart of another example process for workload scheduling based on localizing virtual computing resources.

FIG. 11 depicts a flowchart of another example process for workload scheduling based on localizing virtual computing resources. In some embodiments, the steps described in reference to FIG. 11 can be performed in conjunction with the steps described with regard to FIG. 10.

At block 1110, determining a first and an at least a second latency performance parameters for the first and at least a second computing resource respectively relative to the workload.

At block 1120, switching, responsive to determining that the at least a second latency performance parameter is lesser than the first latency performance parameter, execution of the workload from the first to the at least a second computing resource. In such an embodiment, the workload re-scheduling decision includes moving the first workload to a different physical location to reduce system latency and provide increased responsiveness and processing efficiency with regard to the workload execution.

In some embodiments, the latency performance parameter may be a latency measurement associated with transmission of one or more data packets between a hypervisor application executing on a server device and one or more physical computing resources of the virtualized network, and measuring latency durations associated with the data packet transmitted to and from. In other embodiments, the latency measurement can include processing times in addition to communication transmission durations. In yet another variation, the latency performance parameter may be a latency measurement associated with transmission of one or more data packets between the workload under execution and one or more physical computing resources of the virtualized network, and measuring latency durations associated with the data packet transmitted to and from.

In other embodiments, the re-scheduling decision may be triggered once a data locality regulation or constraint is violated, or about to be violated, whereupon the scheduling decision includes moving the first workload to a different physical location to achieve conformance with the data locality requirements Thus, a computer implemented method, system or apparatus, and computer program product are provided in the illustrative embodiments for workload re-scheduling decisions that includes moving the first workload to a different physical location in a scheme and configuration that provides increased responsiveness, processing efficiency, and benefits as provided herein with regard to the workload execution within a virtualized computing network.

Figure 12:
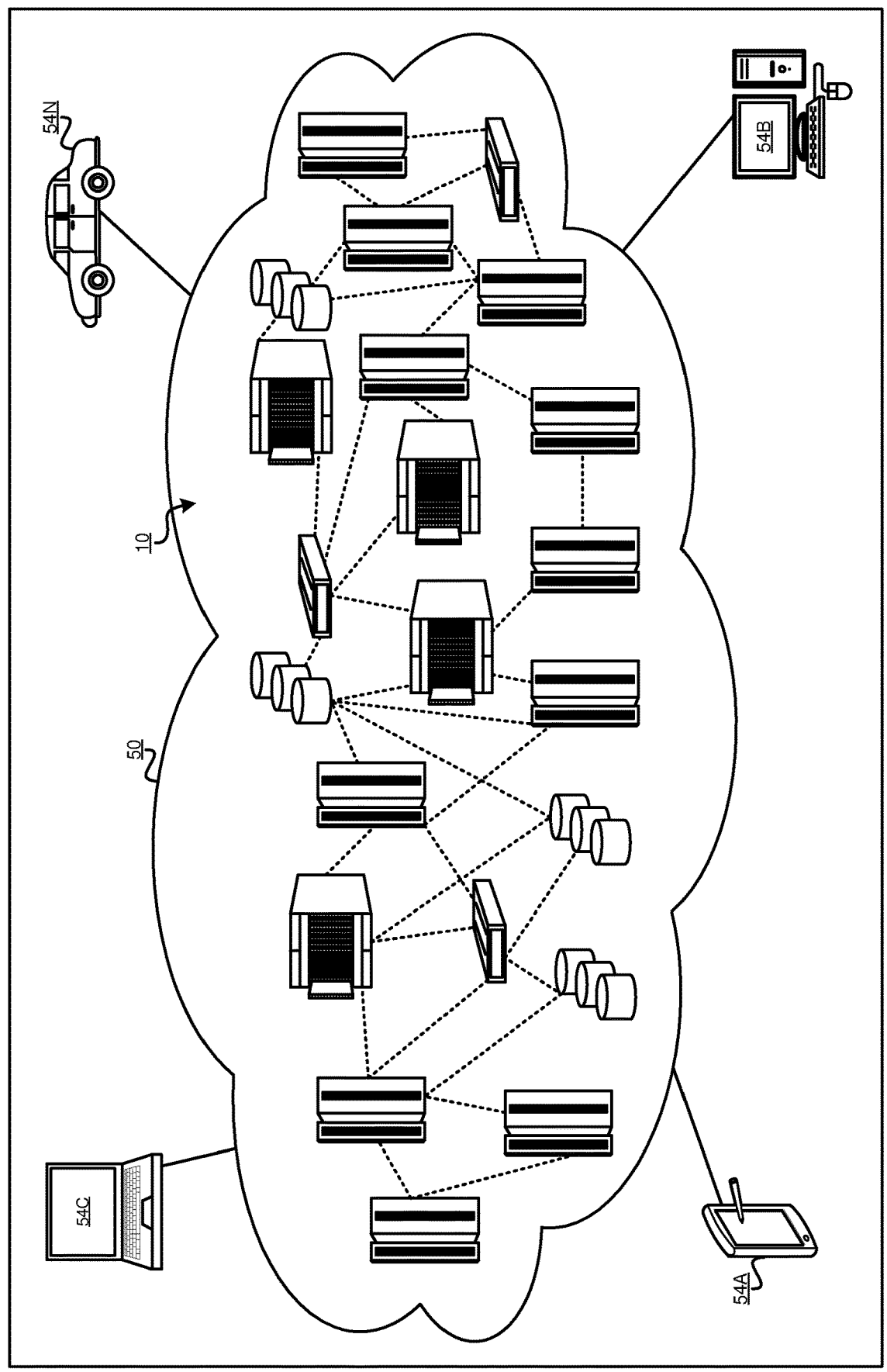
FIG. 12 depicts, in an illustrative embodiment, a cloud computing environment.

FIG. 12 depicts, in an illustrative embodiment, a cloud computing environment. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 13:
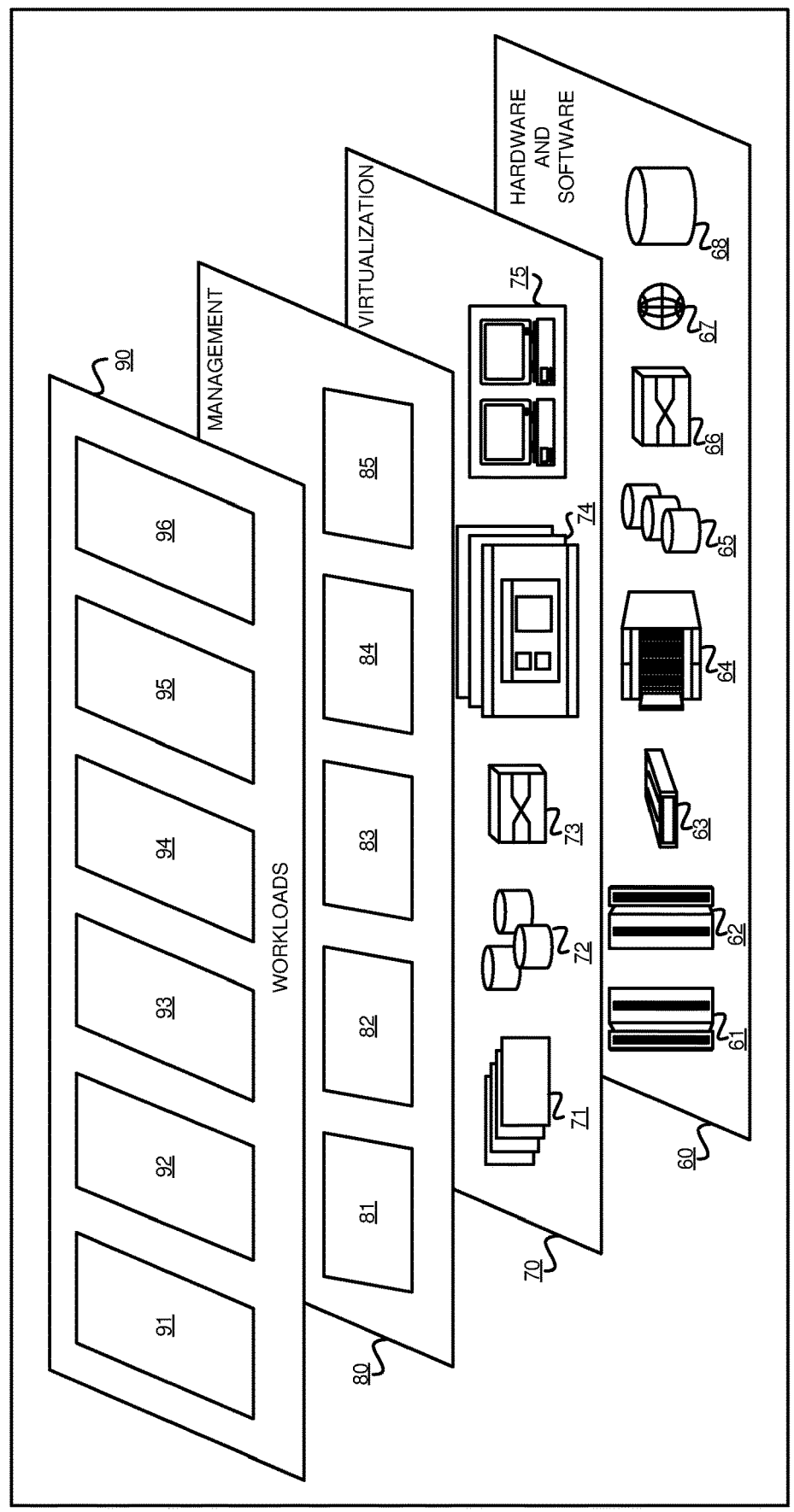
FIG. 13 depicts, in one embodiment, a set of functional abstraction layers provided by a cloud computing environment.

FIG. 13 depicts, in one embodiment, a set of functional abstraction layers provided by a cloud computing environment. It should be understood in advance that the components, layers, and functions shown in FIG. 2 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload rescheduling 96.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the virtual compute resources, including servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   broadcasting a wireless beacon signal in a datacenter to a plurality of computing resources located in the datacenter, wherein the wireless beacon signal comprises a location of the datacenter, and wherein each of the plurality of computing resources receives the location of the datacenter with the wireless beacon signal and locally stores the location of the datacenter as its own location;
   localizing a first computing resource of the plurality of computing resources having a workload under execution, the first computing resource being associated with a set of virtual computing resources, the localizing based on determining a coordinate position of the first computing resource using the location received by the first computing resource with the wireless beacon signal broadcast in the datacenter; and
   rescheduling, responsive to the localizing, the workload for execution at least partially at a second computing resource in the set of virtual computing resources,
   wherein the wireless beacon signal is detectable by a server device, the server device storing location data in accordance with the broadcast, the location data being readable by at least one of a hypervisor application under execution and the workload under execution at the first computing resource.

2. The computer-implemented method of claim 1 further comprising:
   receiving, responsive to the localizing, one of an automatic and a manual trigger; and
   switching, responsive to the one of the automatic and the manual trigger, execution of the workload from the first to the second computing resource.

3. The computer-implemented method of claim 2 wherein the automatic trigger is based at least in part on a latency performance parameter, and further comprising:
   determining a first and an at least a second latency performance parameters for the first and second computing resources respectively relative to the workload; and
   switching, responsive to determining that the at least a second latency performance parameter is lesser than the first latency performance parameter, execution of the workload from the first to the second computing resource.

4. The computer-implemented method of claim 2 wherein the automatic trigger is based at least in part on a data locality requirement, and further comprising:
   switching, responsive to determining that the first computing resource violates a geographical location constraint in accordance with the data locality requirement, execution of the workload from the first to the at least a second computing resource.

5. The computer-implemented method of claim 1 wherein the wireless beacon signal is detectable by a server device based at least in part on a radio frequency (RF) receiver device of the server device.

6. The computer-implemented method of claim 1 wherein the first and the second computing resources are located in respective first and second datacenters having different physical locations.

7. The computer-implemented method of claim 1 wherein the first and second computing resources are included in a respective point of delivery (POD) chassis, the respective POD chassis being mapped to a physical location characteristics dataset stored in at least one of a POD memory and a BIOS associated with the respective POD chassis.

8. The computer-implemented method of claim 7 wherein the localizing further comprises determining a coordinate position of the first and the second computing resources using the physical location characteristics dataset, the physical location characteristics dataset being readable by at least one of a server device, a hypervisor application under execution, and the first workload.

9. A computer usable program product comprising one or more computer-readable storage media, and program instructions stored on at least one of the one or more storage media, the program instructions when executed in one or more processors causing operations comprising:
   broadcasting a wireless beacon signal in a datacenter to a plurality of computing resources located in the datacenter, wherein the wireless beacon signal comprises a location of the datacenter, and wherein each of the plurality of computing resources receives the location of the datacenter with the wireless beacon signal and locally stores the location of the datacenter as its own location;

localizing a first computing resource of the plurality of computing resources having a workload under execution, the first computing resource being associated with a set of virtual computing resources, the localizing based on determining a coordinate position of the first computing resource using the location received by the first computing resource with the wireless beacon signal broadcast in the datacenter; and rescheduling, responsive to the localizing, the workload for execution at least partially at a second computing resource in the set of virtual computing resources, wherein the wireless beacon signal is detectable by a server device, the server device storing location data in accordance with the broadcast, the location data being readable by at least one of a hypervisor application under execution and the workload under execution at the first computing resource.

10. The computer usable program product of claim 9 further comprising instructions when executed in the one or more processors causing operations comprising:

receiving, responsive to the localizing, one of an automatic and a manual trigger; and switching, responsive to the one of the automatic and the manual trigger, execution of the workload from the first to the second computing resource.

11. The computer usable program product of claim 10 wherein the automatic trigger is based at least in part on a latency performance parameter, the instructions when executed in the one or more processors causing operations comprising:

determining a first and an at least a second latency performance parameters for the first and second computing resources respectively relative to the workload; and switching, responsive to determining that the at least a second latency performance parameter is lesser than the first latency performance parameter, execution of the workload from the first to the second computing resource.

12. The computer usable program product of claim 10 wherein the automatic trigger is based at least in part on a data locality requirement, the instructions when executed in the one or more processors causing operations comprising:

switching, responsive to determining that the first computing resource violates a geographical location constraint in accordance with the data locality requirement, execution of the workload from the first to the second computing resource.

13. The computer usable program product of claim 9 wherein the wireless beacon signal is detectable by a server device based at least in part on a radio frequency (RF) receiver device of the server device.

14. The computer usable program product of claim 13 wherein the first and second computing resources are located in respective first and second datacenters having different physical locations.

15. The computer usable program product of claim 9 wherein the first and second computing resources are included in a respective point of delivery (POD) chassis, the respective POD chassis being mapped to a physical location characteristics dataset stored in at least one of a POD memory and a BIOS associated with the respective POD chassis.

16. The computer usable program product of claim 15 wherein the localizing further comprises determining a coordinate position of the second computing resources using the physical location characteristics dataset, the physical location characteristics dataset being readable by at least one of a server device, a hypervisor application under execution, and the first workload.

17. A computer system comprising one or more processors, one or more computer-readable memories, and one or more computer-readable storage devices, and program instructions stored on at least one of the one or more storage devices for execution by at least one of the one or more processors via at least one of the one or more memories, the program instructions when executed in the one or more processors causing operations comprising:

broadcasting a wireless beacon signal in a datacenter to a plurality of computing resources located in the datacenter, wherein the wireless beacon signal comprises a location of the datacenter, and wherein each of the plurality of computing resources receives the location of the datacenter with the wireless beacon signal and locally stores the location of the datacenter as its own location;

localizing a first computing resource of the plurality of computing resources having a workload under execution, the first computing resource being associated with a set of virtual computing resources, the localizing based on determining a coordinate position of the first computing resource using the location received by the first computing resource with the wireless beacon signal broadcast in the datacenter; and rescheduling, responsive to the localizing, the workload for execution at least partially at a second computing resource in the set of virtual computing resources, wherein the wireless beacon signal is detectable by a server device, the server device storing location data in accordance with the broadcast, the location data being readable by at least one of a hypervisor application under execution and the workload under execution at the first computing resource.

* * * * *